Feb. 27, 1934.  R. B. DAY  1,948,565
PROCESS OF SWEETENING GASOLINE
Filed Feb. 27, 1931
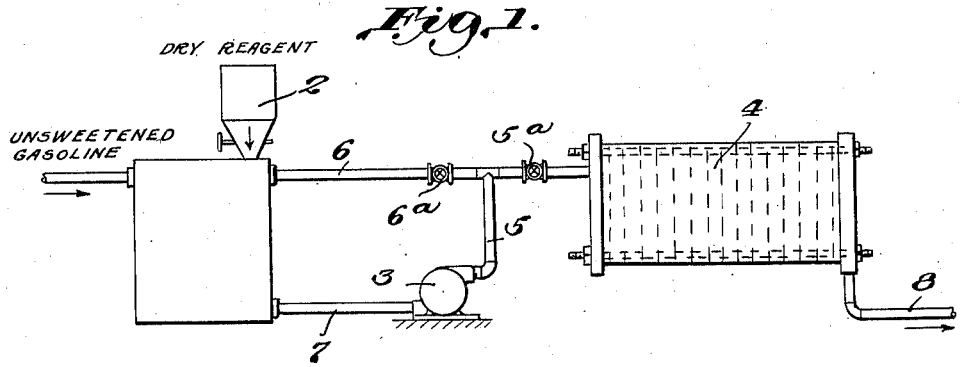
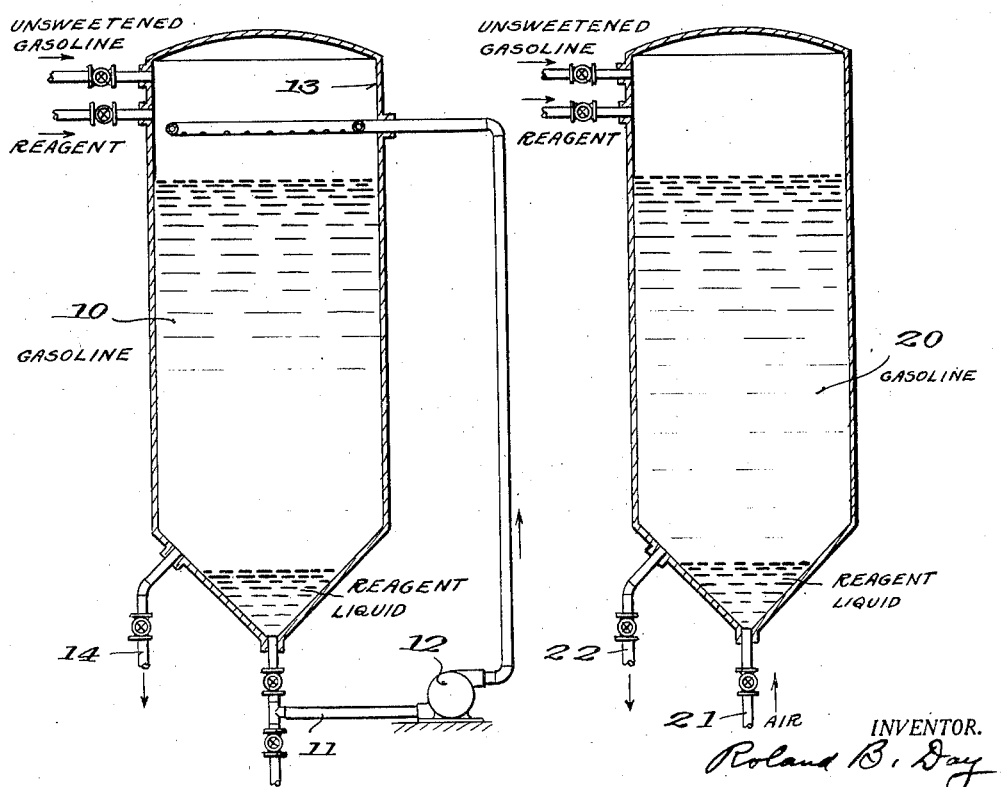
INVENTOR.
Roland B. Day
BY
Stone, Boyden, Mack & Hahn
ATTORNEYS.

Patented Feb. 27, 1934

1,948,565

UNITED STATES PATENT OFFICE 1,948,565

PROCESS OF SWEETENING GASOLINE

Roland B. Day, Palos Verdes Estates, Calif., assignor to Universal Oil Products Company, Chicago, Ill., a corporation of South Dakota Application February 27, 1931, Serial No. 518,796

12 Claims. (Cl. 196—30)

This invention relates to a process for treating light products of hydrocarbon distillation and cracking as well as natural gasolines, for the purpose of improving them as to color, odor, doctor test, and other important characteristics.

More particularly, this invention relates to a process of sweetening sour gasolines, wherein the gasoline is treated with a mixture of mineral salts, and the customary step of treatment with doctor solution is omitted.

Heretofore sour gasolines have been treated for the purpose of sweetening them with a reagent known as "doctor solution" (sodium plumbite) made from a solution of caustic soda in which a definite amount of lead oxide is dissolved. The gasoline is customarily treated with this solution and then sulphur is added to the gasoline. The chemical reaction which takes place is as follows:

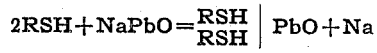

(where R represents the hydrocarbon radicle or radicles to be removed or changed into a form which is not harmful). The above reaction is known as forming mercaptide from mercaptan. The next customary step in present practice is the addition of sulphur. The sulphur reacts as follows:

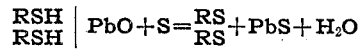

The two original mercaptans are left bound together and in this form are odorless. No sulphur is removed. The objection to this process is the difficulty experienced in adding just the right amount of sulphur to accomplish the second reaction and convert all the mercaptide without adding an excess. This requires very close watching by the operators and the addition of very little sulphur at a time until the reaction occurs. Sometimes hours are spent this way on one batch of gasoline and sometimes too much sulphur is added, which makes the gasoline corrosive, and it has to be redistilled to get rid of the dissolved sulphur and then resweetened, because distillation breaks up the di-sulphide again and renders the gasoline sour.

In the process contemplated by the present invention, a marked saving in time is accomplished in that no sulphur is added and hence the necessary care and watchfulness attendant upon sulphur treatment may be dispensed with, it having been discovered that a mixture of copper sulphate, copper oxide, or other copper compound and ammonium chloride will effect the desired sweetening.

The invention broadly consists in adding a reagent consisting of a mixture of solutions or crystals of copper sulphate, copper oxide or other copper compound and ammonium chloride to a batch of sour gasoline, and agitating the resulting mixture till sweetening of the gasoline occurs. If crystals are used, the mixture is pumped through a conventional filter press having the leaves thereof coated with fuller's earth or other filter aid to separate the sweetened gasoline from the reagent, and the sweetened gasoline is then pumped to storage. If solutions are used, no filtration is necessary, because the aqueous solution will settle out after agitation. As an alternative of this process, the gasoline may be passed in liquid or vapor phase through a mixture of crystals obtained by evaporating a mixture of copper sulphate and ammonium chloride in aqueous solution either with or without addition of fuller's earth or other filter aid to the mixture of crystals. In the first treatment, where the filter press is used, the leaves of the filter press may be coated with a mixture of copper sulphate and ammonium chloride with or without fuller's earth or other filter aid, and the gasoline pumped through without first adding the reagent to the gasoline. This is done in much the same way that clay is now used for finishing gasoline.

This process as carried out in accordance with the present invention may be more readily understood by having reference to the accompanying drawing in which:

Figure 1 represents diagrammatically, a suitable form of apparatus which may be used when the reagents are applied to the gasoline in dry condition;

Figures 2 and 3 represent, diagrammatically two forms of apparatus which may be used when the reagents are applied in solution to the gasoline.

Referring to the drawing, Figure 1, 1 represents a treating vessel or tank into which the gasoline is introduced. Dry crystals of ammonium chloride and a copper compound in dry or crystal condition are fed into the gasoline from a reagent container 2. The crystals, suspended in the gasoline, are pumped through lines 6 and 7 a number of times by opening valve 6ª, closing valve 5ª, and putting pump 3 into operation. This secures thorough intermingling of the reagent crystals and gasoline. Valve 6ª is then closed and valve 5ª opened, with the pump 3 still in operation.

tion, thereby causing the mixture of gasoline and reagents to flow through line 5 and into filter press 4, having a coating on the leaves thereof of fuller's earth, diatomaceous earth, or other filter aid, if desired. The reagent mixture is thereby filtered from the gasoline, which passes to storage through pipe 8.

In case the copper compound and ammonium chloride are used in solution, apparatus such as is shown in Figures 2 or 3 may be used. Referring to Fig. 2, gasoline is introduced into treating vessel 10 and reagents in liquid form are then introduced through a separate pipe. The reagent liquid being heavier than the gasoline, descends through the latter and collects in a pool at the bottom of the vessel as shown. It is pumped slowly through line 11 by the agency of pump 12 and circulates cyclically descending as a spray through a spray nozzle at 13. The cyclic circulation of reagent is repeated as often as is necessary, and the treated gasoline is finally drawn off through pipe 14. In operating with the apparatus shown in Fig. 3, the gasoline and reagent are run into vessel 20 and are agitated and intermixed by the agency of air under pressure admitted through pipe 21. The treated gasoline is drawn off through pipe 22.

I claim:

1. A process of improving gasoline, which process comprises treating the gasoline with a mixture of copper sulphate and ammonium chloride, and collecting the resultant gasoline.

2. A process of improving gasoline, which process comprises treating the gasoline in liquid phase with a mixture of copper sulphate crystals and ammonium chloride crystals, and collecting the resultant gasoline.

3. A process of sweetening gasoline, which process comprises treating the gasoline in liquid phase with the crystals formed by evaporating a mixture of ammonium chloride and copper sulphate solutions, and collecting the resultant gasoline.

4. A process of sweetening gasoline, which process comprises treating the gasoline with a mixture of ammonium chloride crystals, copper sulphate crystals, and fuller's earth, and collecting the resultant gasoline.

5. A process of improving gasoline, which process comprises mixing with the gasoline in liquid phase a reagent containing copper sulphate and ammonium chloride, agitating the mixture of gasoline and reagent, separating the resultant gasoline from the reagent and collecting said resultant gasoline.

6. A process of improving gasoline, which process comprises mixing with the gasoline in liquid phase a reagent comprising a mixture of ammonium chloride and copper sulphate, agitating the mixture of gasoline and reagent, passing the mixture of gasoline and reagent through a filtering device to filter the resultant gasoline from the reagent, and collecting the resultant gasoline.

7. A process of improving gasoline which process comprises mixing with the gasoline in liquid phase a reagent comprising a mixture of ammonium chloride and copper sulphate, agitating the mixture of gasoline and reagent, passing the mixture of gasoline and reagent through a filtering device containing fuller's earth, thereby separating the resultant gasoline from the reagent by filtration, and collecting the resultant gasoline.

8. A process of sweetening gasoline, which process comprises passing the gasoline through a filter bed composed of copper sulphate crystals and ammonium chloride crystals, and collecting the resultant gasoline.

9. A process of sweetening gasoline, which process comprises passing the gasoline in liquid phase through a filter bed composed of copper sulphate crystals and ammonium chloride crystals, and collecting the resultant gasoline.

10. A process of sweetening gasoline, which process comprises passing the gasoline in liquid phase through a filter bed composed of copper sulphate crystals, ammonium chloride crystals, and fuller's earth, and collecting the resultant gasoline.

11. A process of improving gasoline, which process comprises treating the gasoline with a mixture of a copper compound and ammonium chloride, and collecting the resultant gasoline.

12. A process of improving gasoline, which process comprises treating the gasoline to be improved with a mixture of copper oxide and ammonium chloride, and collecting the resultant gasoline.

ROLAND B. DAY.